United States Patent [19]

Dansac et al.

[11] 4,175,285
[45] Nov. 20, 1979

[54] NAVIGATIONAL SYSTEM OF HIGH-SPEED AIRCRAFT

[75] Inventors: Jean Dansac, Paris; Georges Couderc, Meudon, both of France

[73] Assignee: Thomson-CSF, Paris, France

[21] Appl. No.: 665,195

[22] Filed: Aug. 25, 1967

[51] Int. Cl.² .............................................. G06F 15/50
[52] U.S. Cl. ............................ 364/456; 340/146.3 Q; 343/5 MM; 364/604
[58] Field of Search ........................... 235/150.27, 181; 88/160 SR; 250/219 TD; 350/162; 364/456, 447, 604; 343/5 MM; 340/146.3 Q, 146.3 H (U.S. only)

[56] References Cited

U.S. PATENT DOCUMENTS

| | | | |
|---|---|---|---|
| 3,328,795 | 6/1967 | Hallmark | 343/5 UX |
| 3,740,747 | 6/1973 | Hance et al. | 343/5 MM |
| 3,794,272 | 2/1974 | Hecker | 364/604 |
| 3,805,261 | 4/1974 | Deschamps et al. | 343/5 MM |

Primary Examiner—Howard A. Birmiel
Attorney, Agent, or Firm—Karl F. Ross

[57] ABSTRACT

Navigational system for the guidance of automatically piloted aircraft during high-speed (e.g. supersonic) overland flights, the predetermined course of the aircraft including a series of spaced-apart measuring zones registered on a progressively displaceable film strip or other recording medium in the form of two-dimensional arrays of prerecorded altitude markings representing the profile of the overflown terrain within each zone. Each array encompasses several regions of uncertainty defined as a range of possible horizontal deviation of the automatic pilot from the charted course; the markings, which may be in the form of identical asymmetrical figures indicating by their angular orientation the reference parameter (absolute or relative altitude) of the terrain within each elemental area of a region of uncertainty, are electro-optically compared with a bench mark indicating, by its own angular orientation in response to altitude soundings aboard the aircraft, the value of the reference parameter of the terrain actually overflown, the comparison yielding a projected contour line whereby, through a rapid succession of soundings and comparisons within each zone, the true position of the aircraft can be determined from the intersection of the several contour lines so obtained.

17 Claims, 15 Drawing Figures

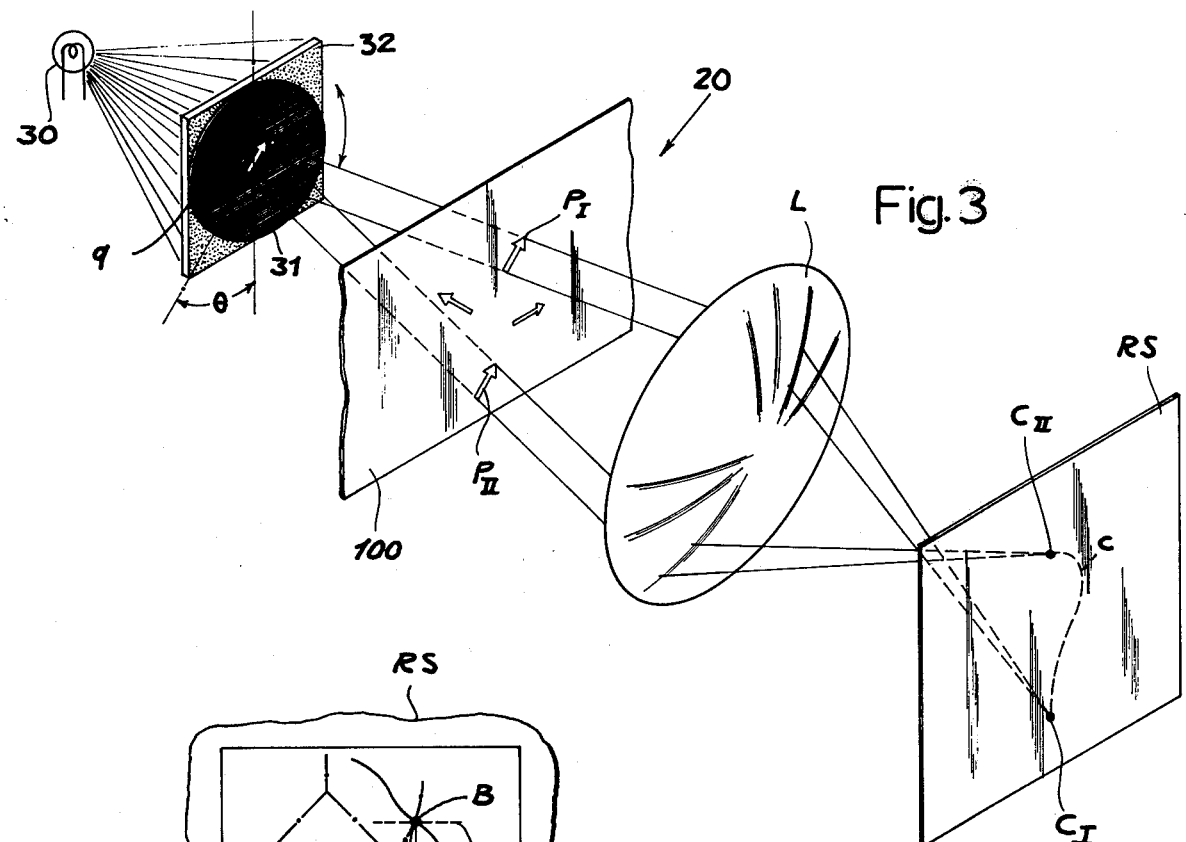
Fig. 3
Fig. 2
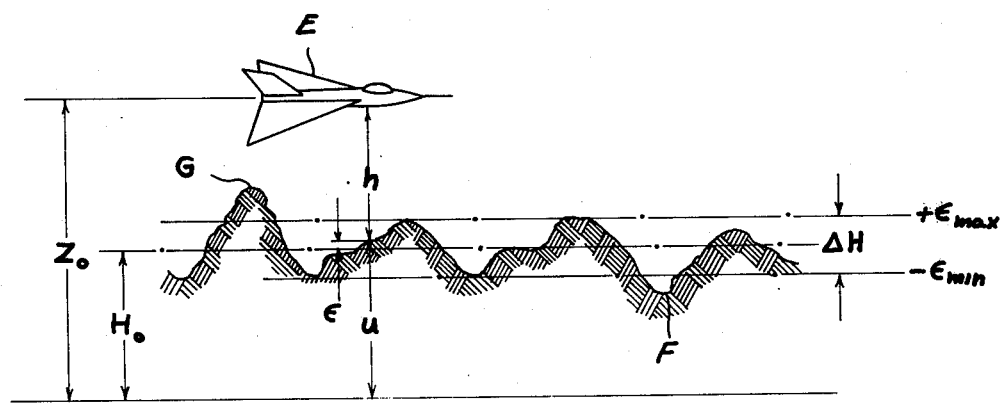
Fig. 7

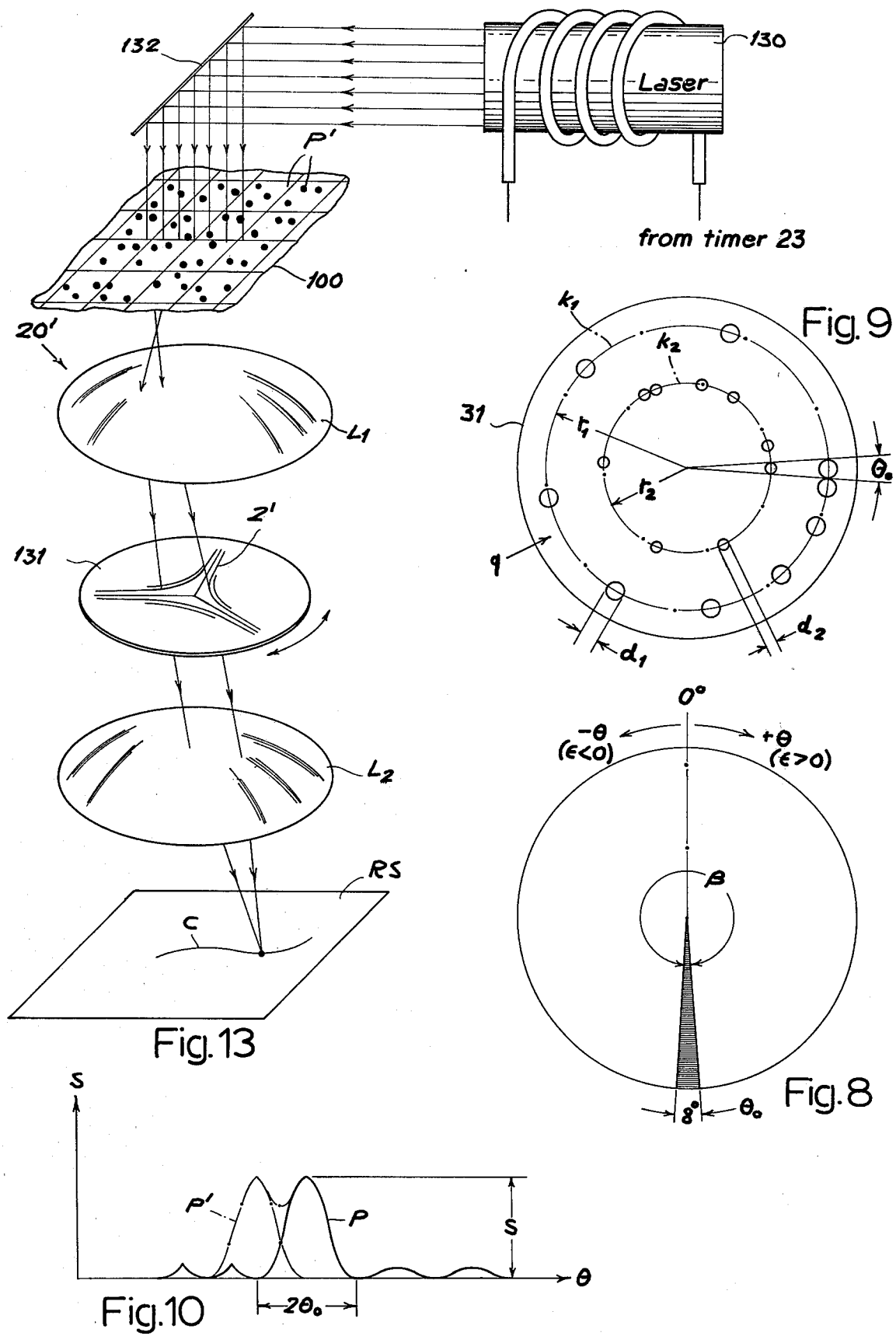

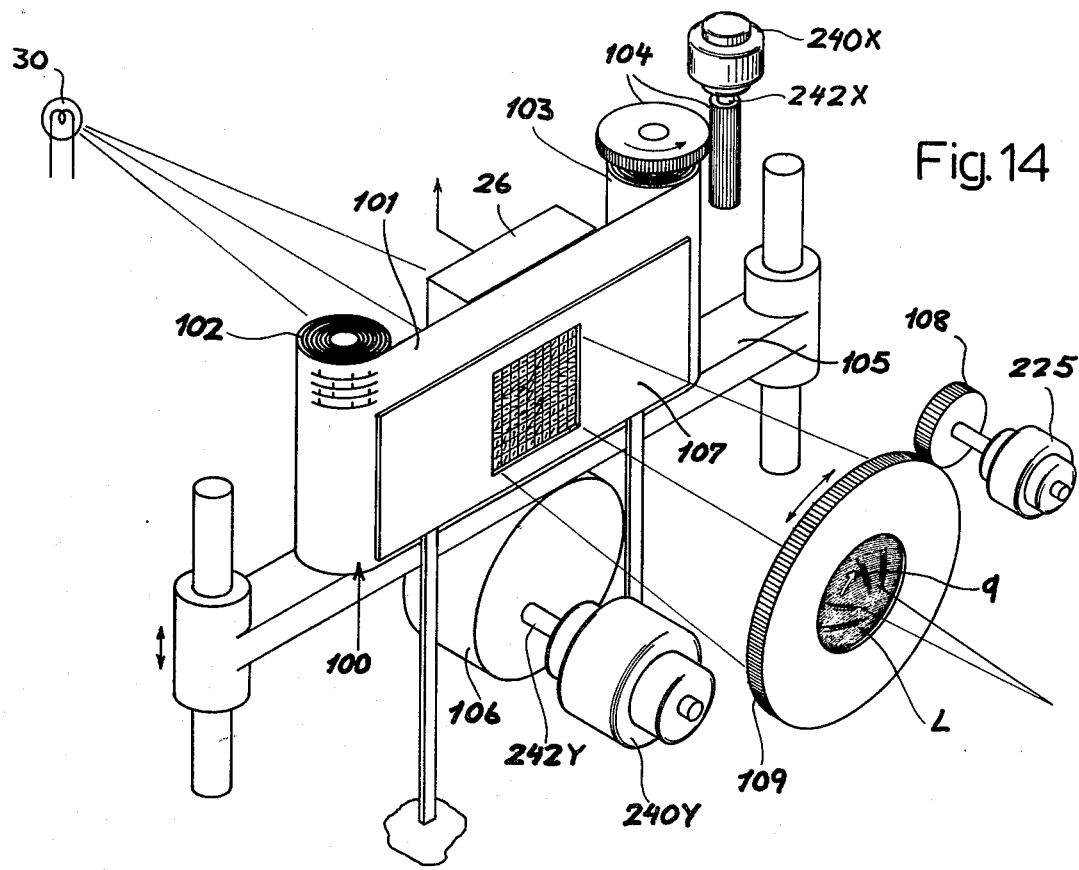
Fig. 14
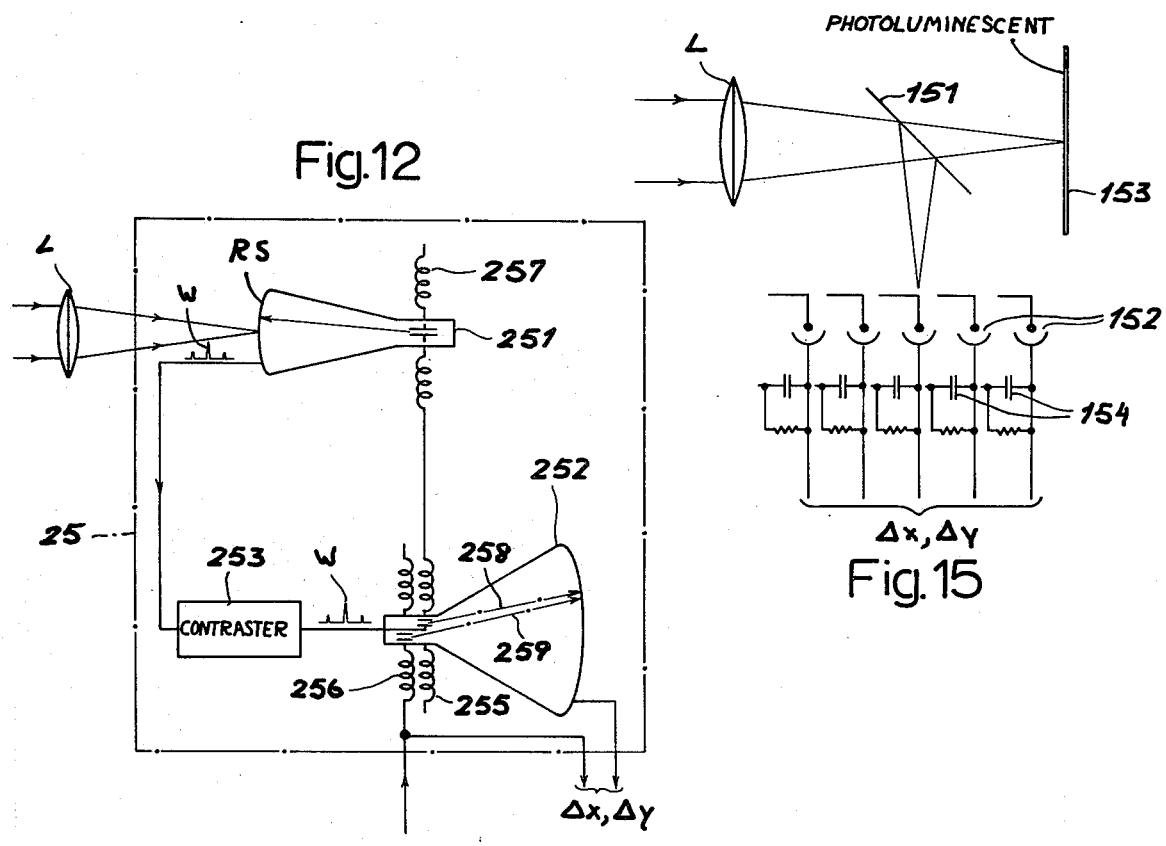
Fig. 12
Fig. 15

NAVIGATIONAL SYSTEM OF HIGH-SPEED AIRCRAFT

Our present invention relates to a navigational system for the guidance of automatically piloted aircraft, traveling at high and especially supersonic speeds (e.g. up to Mach 2), by reference to more or less permanent and rapidly ascertainable characteristics of the overflown terrain. Such characteristics particularly include the absolute and relative altitudes of the ground during flights passing entirely or predominantly over land; other possible reference parameters are ground color (for daytime flights), the light distribution of cities (at night) and the reflectivity of the soil for electromagnetic radiation. Altitude is preferred since it is not subject to seasonal variations and can be most easily charted from available maps.

Even with the use of inertial guidance systems of great accuracy, the actual course of an aircraft tends to deviate from its charted path to a significant extent which may account for a region of uncertainty on the order of 1 km$^2$ or more after a flight of, say, 100 km from the point of origin or last rectification of the flight path. With a speed of Mach 2, the craft covers such a distance every 2½ minutes. At these high velocities, and at the great altitudes at which such aircraft normally travel, correction of the operation of the autopilot on the basis of direct visual observation of the terrain becomes rather impractical. Since vertical deviations can be readily determined and, if necessary, corrected by conventional altimetric equipment, it is especially the horizontal error (due to lateral drifts and/or speed variations) which merits particular attention.

The general object of our present invention is to provide a navigational system for the purpose set forth which automatically, in response to periodic measurements of a reference parameter (e.g. altitude) aboard the craft, ascertains the horizontal deviation of the actual flight path from the predetermined course and furnishes corrective information to a human pilot and/or to a computer associated with the autopilot.

A more particular object of our invention is to provide a system of this type which has a high power of resolution so as to be capable of relying upon minor differences in ground level to establish with accuracy the true position of the craft.

It is also an object of the instant invention to provide highly compact means in such system for storing detailed information on the profile of the overflown terrain, in the vicinity of the charted course within successive measuring zones, so as to enable a precise determination of the true path of the craft within each zone.

The foregoing object are realized, pursuant to our present invention, by the provision aboard the aircraft of a set of optically explorable topographic charts, which may form part of a continuous recording medium such as a film strip, each carrying a two-dimensional array of prerecorded markings representative of the different values of a reference parameter (such as absolute or relative altitude) of elemental areas of a respective measuring zone located along a predetermined course; an optical correlator compares these markings with an adjustable bench mark signifying, by its position, the value of the reference parameter of the terrain actually overflown, as instantly determined by measurements taken aboard the craft, while the chart and the correlator are relatively displaced in a manner keeping the optical axis of the correlator aligned with an imaginary trace on the chart representing the presumed trajectory of the aircraft through the measuring zone. During each comparison, a multiplicity of which are performed with the correlator trained upon different measuring points on the simulated trajectory, a group of prerecorded markings within a region of uncertainty centered on the respective measuring points are simultaneously sampled, the correlator thereby establishing a set of locations within the array which represent elemental areas of the same reference parameter within the region of uncertainty and which together define a contour line, usually curved and possibly branched, whereon the true position of the craft must lie. Thus, a rapid succession of such measurements and comparisons will furnish a plurality of contour lines which, when projected upon a common evaluation surface, intersect at a point representing that position.

The evaluation surface may be constituted by a luminescent screen or by a mosaic of electronically chargeable elements as used in a conventional storage tube. Thus, according to a specific embodiment, we may first project the contour lines upon the screen of a television-camera tube, e.g. of the vidicon type, which energizes the aforementioned storage tube coupled therewith for synchronous scanning. Subsequently, i.e. after the aircraft has left the measuring zone, the mosaic of the storage tube is scanned by a reading beam to produce an output signal proportional to point charges encountered by the reading beam in its sweep across the mosaic, this signal being fed to an associated computer. It is, however, also possible to constitute the evaluation surface from an array of photocells or other photosensitive elements working into respective charge accumulators such as condensers which, upon exceeding a certain storage level, produce an output signal which can likewise be used to control a computer. The receiving screen or charge accumulator must, of course, have a storage time sufficient for cumulative retention of impinging luminous or electronic energy throughout a succession of measuring cycles within a particular zone of the flight path in which the deviation from the charted course is to be determined.

In accordance with a more specific feature of our invention, the prerecorded markings on each terrain chart are in the form of asymmetrical transparent figures of identical configuration, such as a pattern of holes, whose angular orientation in relation to a reference direction represents the magnitude of the relevant parameter (e.g. altitude) of the corresponding elemental area of the terrain below. During sampling, light rays passing through these distinctively oriented transparencies must also traverse a centrally positioned orientable light gate which represents the bench mark and whose own angular position is varied in response to a measurement (e.g. altitude sounding by high-frequency waves) taken concurrently with or just prior to sampling. If diffused light is used to illuminate the sampled group of transparencies, the light gate may be constituted by a similar central transparency so that a beam of parallel or near-parallel rays is formed by light passing concurrently through this central transparency and through a similarly oriented figure of the terrain chart. The rays of this beam are then focused, by a lens or equivalent optical element, upon a receiving surface identical or electronically coupled with the evaluation surface on which they create a localized output whose co-ordinates with reference to the optical axis of the correlator are determined by the location of the transmitting figure on the terrain chart. In most instances there will exist a large number of substantially parallel figures within the sampled group whose orientation corresponds to that of the light gate and which produce a corresponding number of light beams giving rise to a like number of projected points that define the aforementioned contour line. Occasionally, as during overflow of a sharp peak, the line will be reduced to a single point.

In lieu of diffused light we may also use a source of coherent radiation, such as a laser, which is briefly triggered on during sampling and which gives rise to distinctively oriented diffraction patterns if the markings on the recording medium are constituted by groups of pinholes, the light gate being then a transparency corresponding to the diffraction pattern of a group of pinholes having the proper angular orientation.

In either case, the optical projection system enables an instantaneous autocorrelation between the rotatable light gate, representing by its position the measured parameter of the overflown terrain, and every one of the prerecorded markings of a particular region of uncertainty representing the same parameter. The relief of the overflown terrain is likely to change considerably on extended flights. In a mountainous region there may be sharp differences in level, e.g. on the order of 1000 meters, whereas elsewhere the variation in altitude may be much less pronounced. For optimum utilization of the existing topographic formations in the guidance of an aircraft equipped with our present system, a further feature of our invention provides for a prerecording of the depth of profile of each measuring zone on the record carrier to enable an adjustment of the extent to which the orientable bench mark must be rotated to indicate a given change in altitude in different measuring zones or, possibly, in different parts of a single zone.

The invention will be described in greater detail with reference to the accompanying drawing in which:

FIG. 2 is a diagram illustrating the intersection, on a receiving surface, of contour lines sequentially produced by a correlator incorporating the topographic chart of FIG. 1;

FIG. 3 shows, somewhat schematically, the correlator in perspective view;

FIG. 7 shows the profile of a stretch of terrain overflown by a aircraft equipped with the system of FIG. 4;

FIG. 8 is a diagram showing the range of adjustment of a bench mark forming part of the correlator of FIG. 3;

FIG. 9 illustrates the shape of a typical bench mark and pattern on the chart of FIG. 1;

FIG. 10 is a pulse diagram showing the output of the correlator as a function of the orientation of the bench mark;

Figure 4:
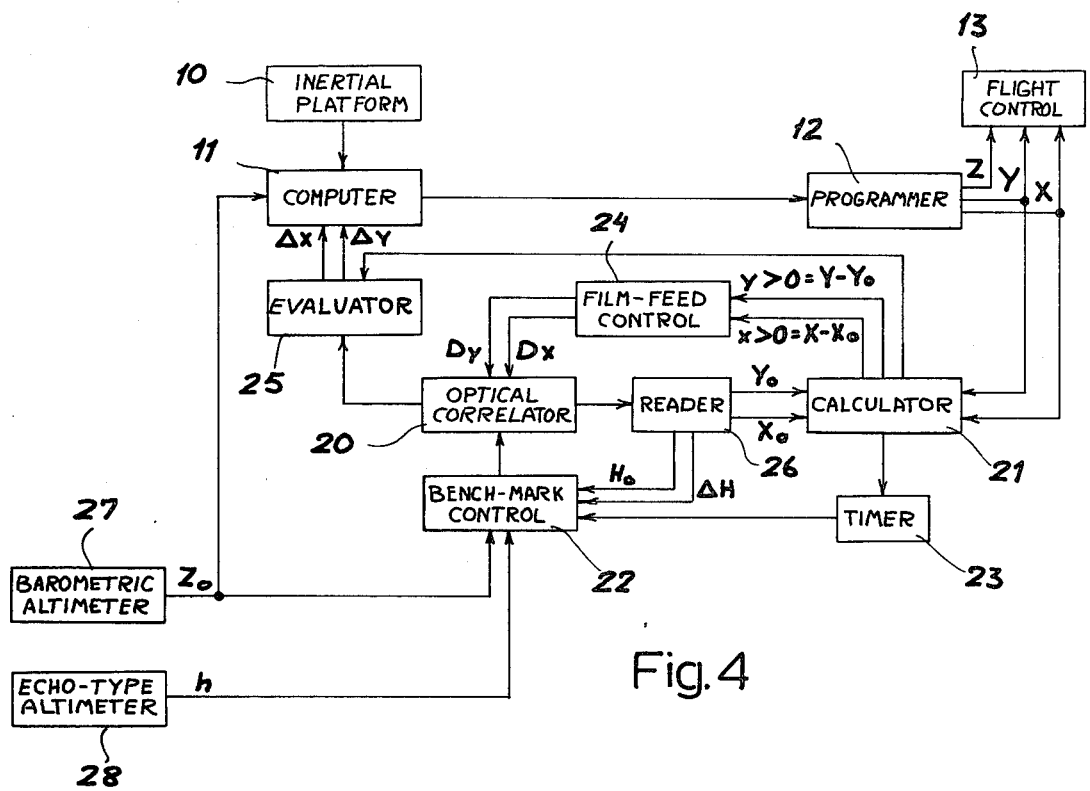
FIG. 4 is a circuit diagram of a navigational system according to our invention; embodying the correlator of FIG. 3.

FIG. 12 diagrammatically illustrates a typical signal evaluator forming part of the system of FIG. 4;

FIG. 13 is a view generally similar to FIG. 3, showing a modified correlator;

FIG. 14 is a perspective view of a correlator similar to that shown in FIG. 3; and FIG. 15 diagrammatically illustrates an alternate evaluation circuit.

Figure 1:
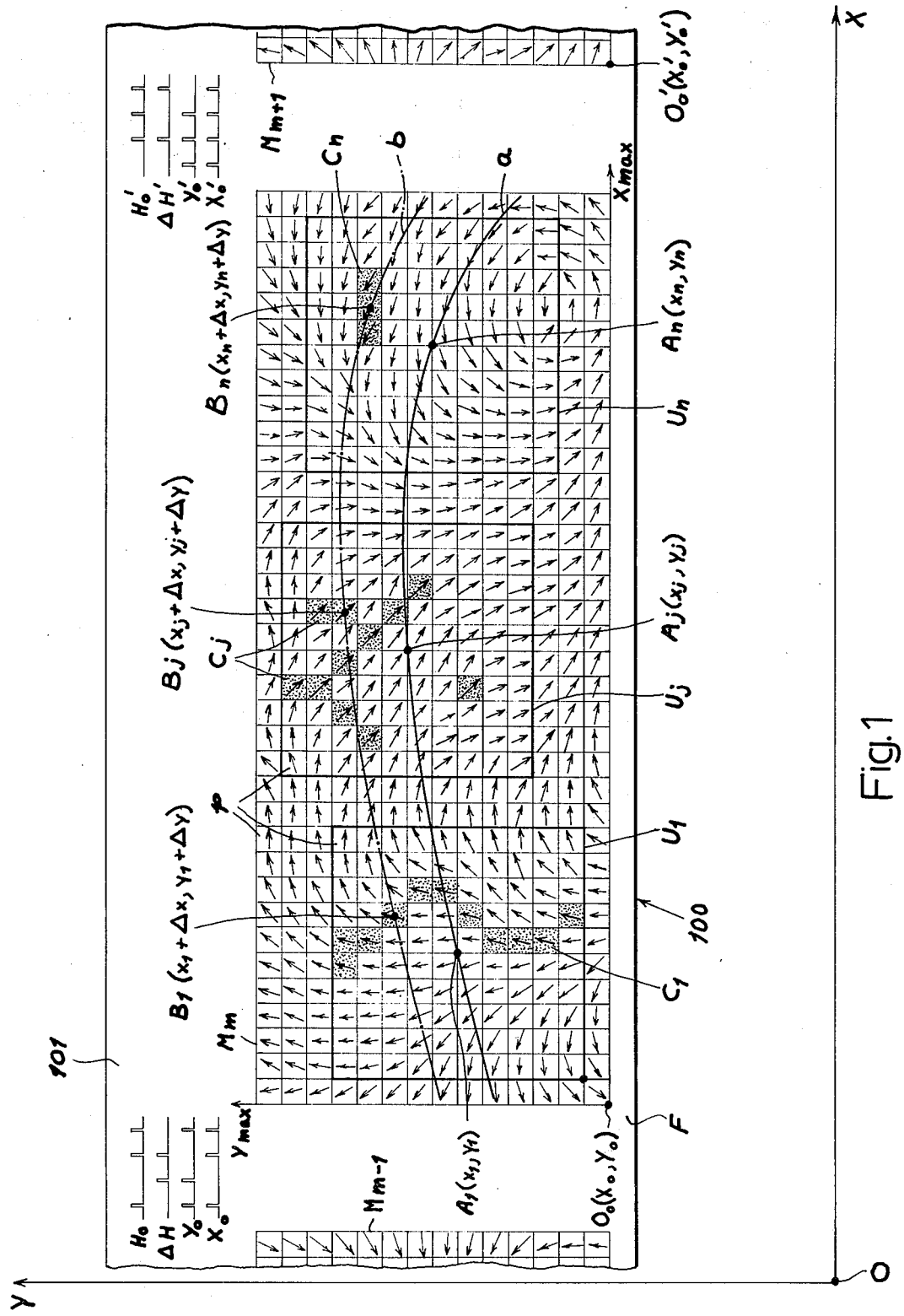
FIG. 1 is a diagrammatic view of a topographic chart forming part of a film strip which serves as a recordind medium in a system according to the invention.

Reference will first be made to FIG. 1 which shows a recording medium, in the form of a film strip 100, having printed thereon a number of spaced-apart two-dimensional arrays representing the topograhic aspects of the ground below, as viewed from an aircraft equipped with a system according to our invention, in respective measuring zones. Three such arrays, designated $M_{m-1}$, and $M_m$ and $M_{m+1}$, have been illustrated. It may be assumed that, with the aircraft traveling at supersonic speeds over a distance of several thousands of kilometers, the measuring zones are separated by distances on the order of 100 km representing a flight time of a few minutes. It may be further assumed that an inertial guidance system aboard the airplane, such as a gyroscopically stabilized platform, holds the craft so close to its assigned course that the maximum horizontal deviation therefrom over a flight path of 100 km will be approximately 500 to 600 m in any direction. This maximum deviation represents the radius of a zone of uncertainty, ideally a circle, which for convenience will be regarded hereinafter as a square or more generally a rectangle. Such a zone of uncertainty, extending over an area of roughly 1 $km^2$, may in turn be subdivided into 100 or more elemental areas or meshes, with the entire measuring zone encompassing 10,000 or more of such meshes. The foregoing figures are, of course, given merely by way of illustration.

The trace a shown in FIG. 1, passing approximately midway through the chart $M_m$, is a simulated trajectory representing the predetermined course of the craft through this particular measuring zone. The corner $O_o$ of the array $M_m$ is the origin of a co-ordinate system x, y within which separate points $A_1, \ldots A_j, \ldots A_n$ have the co-ordinates $(x_1, y_1)$, $(x_j, y_j)$, $(x_n, y_n)$, respectively. Each of these points $A_1$ etc. is surrounded by its own zone of uncertainty $U_1$, $U_j$, $U_n$. The true flight path of the aircraft, shown at b, must pass through all these zones of uncertainty and is regarded as parallel to the trajectory a since, during its short traverse of the measuring zone, the existing deviation between the actual and the assumed course may be considered constant; thus, while the craft supposedly passes through points $A_1$, $A_j$, $A_n$ of its assigned course, its true positions will be $B_1(x_1+\Delta x, y_1+\Delta y)$, $B_j(x_j+\Delta x, y_j+\Delta y)$, $B_n(x_n+\Delta x, y_n+\Delta y)$, respectively.

With reference to a starting point O, signifying the origin of the flight, the origin $O_o$ of array $M_m$ has the co-ordinates $X_o$, $Y_o$ in a co-ordinate system X, Y; in the same system, the origin $O_o'$ of the next-following array $M_{m+1}$ has the co-ordinates $X_o'$, $Y_o'$. Thus, the co-ordinates x, y within the array are given by the relationship $x=X-X_o$, $y=Y-Y_o$. The magnitudes of $X_o$, $Y_o$ are recorded, advantageously in binary form, on a marginal portion 101 of the film 100 at a location between arrays $M_{m-1}$ and $M_m$, together with the mean altitude $H_o$ and the significant level difference $\Delta H$ of the terrain represented by the array $M_m$; corresponding values $X_o'$, $Y_o'$, $H_o'$ and $\Delta H'$ for the array $M_{m+1}$ are registered on the film portion 101 just ahead of the latter array.

The elemental areas of each array carry prerecorded patterns p, here symbolized by arrows, which by their angular position indicate the relative altitude of the terrain below with reference to its mean altitude $H_o$. It will be seen that point $B_1$ registers with an area defining, together with other areas (shaded) of like altitude, a contour line $c_1$ within the region of uncertainty $U_1$. Similar contour lines $c_j$ and $c_n$ exist in regions $U_j$, $U_n$ and include the points $B_j$, $B_n$, respectively.

In FIG. 2 we have shown the contour lines $c_1$ (solid), $c_j$ (dot-dash) and $c_n$ (dotted) projected upon a receiving surface RS, within a common region of uncertainty U centered upon a point A which represents the coincident projections of all the points $A_1, \ldots A_j, \ldots A_n$ of FIG. 1. These contour lines intersect in a point B whose position with reference to point A is given by the co-ordinates $\Delta x$, $\Delta y$. The magnitude of the deviation $\Delta x$, $\Delta y$ can thus be determined, visually or by automatic means described hereinafter, from the position of intersection B relative to the center A of the region U.

In FIG. 3 we have shown an optical correlator 20 designed to project the contour lines of FIGS. 1 and 2 upon the receiving surface RS. This correlator comprises a source of diffused light, shown as a flash lamp 30 and a ground-glass plate 32, illuminating a rotatable bench mark 31 here represented diagrammatically by a transparent arrow q having the same shape as the transparencies p on the film 100. Several such transparencies have been shown on that film in FIG. 3, two of them (designated $p_I$ and $p_{II}$) having the same orientation as the mark q which forms a light gate for the rays of source 30, 32. With the film 100 passing at some distance from the rotatable gate carrier 31, rays traversing the two parallel transparencies q and $p_I$ will form a parallel bundle which is focused on an objective, shown as a lens L, upon the surface RS which coincides with the focal plane of the lens and on which this ray bundle or beam converges at a point $C_I$. Similarly, rays traversing the gate q and the transparency $p_{II}$ give rise to a parallel bundle focused at point $C_{II}$ on surface RS. Points $C_I$, $C_{II}$ form part of a contour line c conforming to the positions of all the recorded transparencies on film 100 whose angular orientation is the same as that of the transparency q. All other transparencies, though likewise illuminated by light from lamp 30, will not generate a field of parallel rays and will, therefore, not produce a distinct luminous spot on surface RS. Thus, the device 20 shown in FIG. 3 operates as an autocorrelator instantly projecting onto the receiving surface RS a trace of all the recorded patterns on film 100 having a predetermined angular orientation, i.e. the orientation of light gate q. If the mark q were geometrically similar to but not exactly congruent with the markings p on the film, the rays traversing the properly oriented transparencies would be divergent or convergent rather than parallel; this could be compensated by a shift in the position of surface RS away from the focal plane of lens L.

FIG. 4 shows the overall navigational guidance system of which the correlator 20 of FIG. 3 forms a part. An inertial platform 10 delivers its output to a computer 11 which controls the operation of a programmer 12 serving to plot the preassigned course. The output of the programmer, representing the horizontal co-ordinates X, Y and the desired altitude Z of the charted course, is fed to the flight control equipment 13 of the craft in the conventional manner.

A calculator 21 receives the variables X, Y from programmer 12 and the values $X_o$, $Y_o$ form a reader 26 which is juxtaposed with the marginal film portion 101 (FIG. 1) bearing that information. Calculator 21 derives from these data the values of x and y and, whenever these values are greater than zero, operates a film-feed control 24 as more fully described hereinafter with referencce to FIG. 6. At the same time, i.e. when x and y assume positive values, a timer 23 is started to enable a bench-mark control 22 which repetitively, at short intervals, adjusts the position of light gate 31 and simultaneously triggers the lamp 30 (FIG. 3) of the correlator 20. Control unit 22 responds to input signals from a barometric altimeter 27, showing the absolute altitude $Z_o$ of the craft, and from an echo-type radio altimeter 28 indicating the relative height h of the craft above ground. Altimeter 27 also feeds its output $Z_o$ to the computer 11 to correct vertical deviations from the assigned course. Evaluator 25, responsive to the output of correlator 20, determines the magnitude $\Delta x$, $\Delta y$ and feeds them to the computer 11 to correct for horizontal deviations.

The operation of timer 23 is halted by the calculator 21 whenever the correlator axis A (FIG. 2) passes out of the area of the array on which it was trained, this being generally the case when $x = x_{max}$. It is, however, conveivable that the correlator axis leaves the array by one of its other edges, with $y = y_{max}$, $x = 0$ and/or $y = 0$; any one of these values will, therefore, arrest the timer. In the normal operation of the system, feeding of the film in the direction X (accompanied by possible transverse shifts in the direction Y) will continue until the reader 26 reaches the marginal recordings identifying the new co-ordinate values $X_o'$ and $Y_o'$. Then the film will come to rest, the calculator also initiating the operation of evaluator 25, until the output of programmer 12 indicates a position in which $X > X_o'$ and $Y > Y_o'$ whereupon the aforedescribed samplings are resumed with reference to the measuring zone represented by array $M_{m+1}$.

Figure 5:
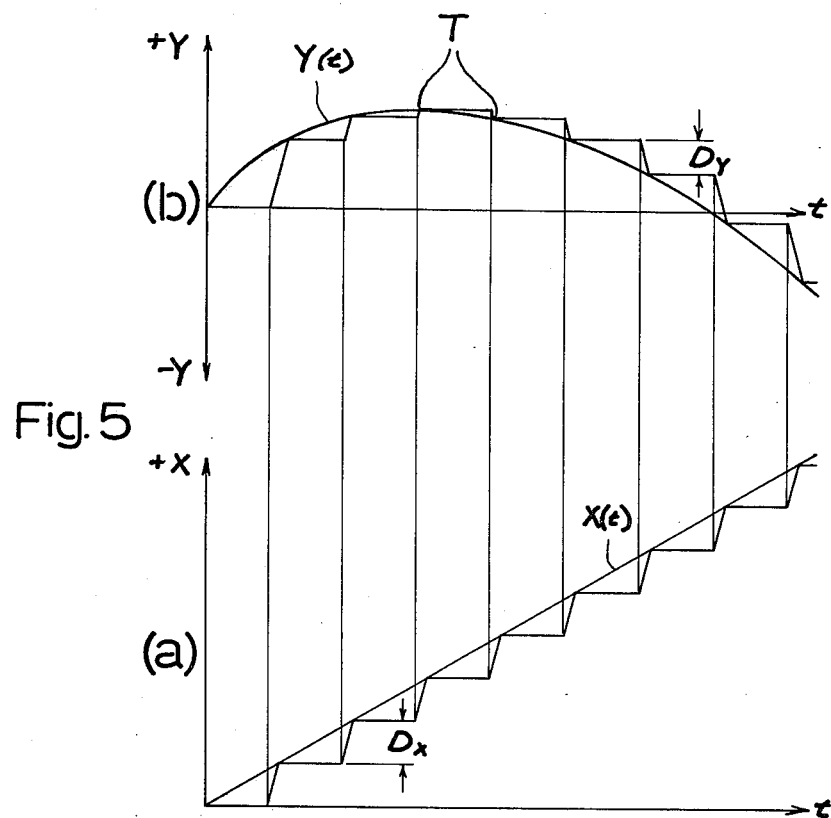
FIG. 5 is a diagram illustrating a stepwise displacement of the topographic chart relative to the correlator.

The displacement of a topographic chart such as the array $M_m$ with reference to the correlator elements 30–32, L, RS along the simulated trajectory a may be carried out either continuously or in steps, the latter mode being preferred since it can be realized by more simple means and since it affords intervals of standstill during which the array may be sampled. This method of displacement has been illustrated in FIG. 5 where graph (a) shows the longitudinal motion of the film 100 (direction X) whereas graph (b) represents the transverse displacement (direction Y). As the longitudinal direction X coincides generally with the flight path, this co-ordinate will usually assume only positive and progressively increasing values. The co-ordinate Y, on the other hand, may be either positive or negative. Also, with a substantially constant forward speed, X may be more or less proportional to time t as shown at X(t) in FIG. 5(a). Thus, a succession of substantially identical steps Dx, representing an intermittent advance of the film 100, will align the correlator axis A (FIG. 2) with the track a at successive times T during which the timer 23 of FIG. 4 actuates the bench-mark control 22 and the correlator 20. At the same instants T, as shown in graph 5(b), the transverse displacement of the film by a series of steps Dy also comes to a halt; the increments Dy may be either positive or negative, depending on the sign of the function Y(t).

Figure 6:
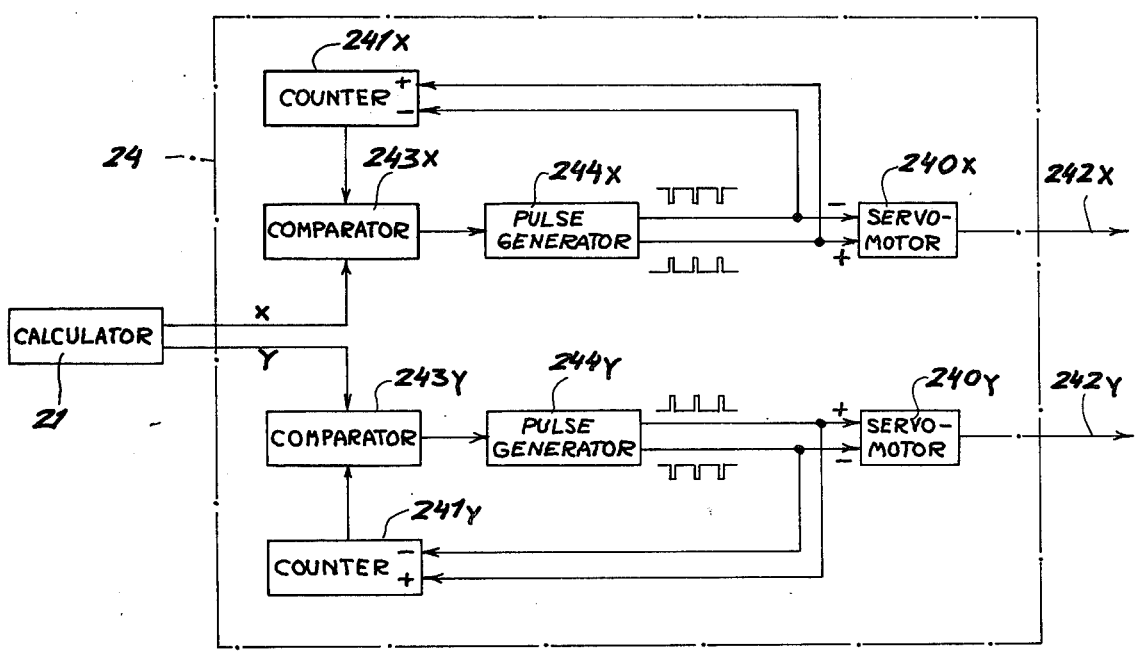
FIG. 6 is a block diagram of a control unit included in the system of FIG. 4, serving to perform the movement illustrated in FIG. 5.

In FIGS. 6 we have shown details of the unit 24 which performs the aforedescribed stepped displacement of the film in two dimensions. Two servomotors 240x and 240y advance the film longitudinally and shift it transversely, by a mechanical arrangement such as that shown in FIG. 14 described hereinafter. Calculator 21 delivers outputs proportional to x and y, advantageously in binary form, to a pair of comparators 243x, 243y which trigger respective pulse generators 244x, 244y to step the associated servomotors 240x and 240y in one or the other direction. The positive or negative output pulses of generators 244x and 244y are also applied to respective counters 241x and 241y to increase or decrease, according to their polarity, the numerical values stored in these counters. Whenever these numerical values equal the magnitude of x and y as supplied by the calculator 21, the comparators 243x and 243y deactivate the corresponding pulse generators 244x and 244y so that servomotors 240x and 240y come to a stop. These servomotors, whose output shafts have been indicated diagrammatically at 242x and 242y in FIG. 6, are of very low inertia and therefore operate within a small fraction of a measuring interval as indicated by the nearly vertical lines in FIG. 5.

In order to obtain a large number of contour lines for a sharp definition of the point of intersection B shown in FIG. 2, we prefer to provide for as many as 100 or more samplings of each topographic chart, each sampling involving an operation of at least one of the servomotors 240x, 240y to advance the correlator axis to a new point on trajectory a. The corresponding zones of uncertainty $U_1 \ldots U_n$, respectively centered on the points $A_1 \ldots A_n$, will thus overlap so that many of the overlapping markings p will be sampled a number of times.

In FIG. 7 we have shown an aircraft E overflying a stretch of mountainous ground at an altitude $Z_o$ with reference to sea level as determined by the barometric altimeter 27 of FIG. 4. At each instant of flight, microwave soundings made by the echo-type altimeter 28 establish the height h of the aircraft above ground, with $Z_o-h$ representing the absolute altitude u of the terrain just overflown. While this absolute altitude u could be used directly to set the bench mark of the correlator 20, we prefer to use instead the relative altitude $\epsilon=u-H_o$ where $H_o$ is the average level of the terrain included in a measuring zone. This average level is computed as the mean of the significant upper and lower limits $\epsilon_{max}$ and $\epsilon_{min}$ of the altitude range within that zone, it being understood that isolated troughs or peaks, as shown at F and G, may extend beyond these limits. The significant altitude range may be expressed by the depth of profile $\Delta H = \epsilon_{max} - \epsilon_{min}$ and, together with the mean altitude $H_o$, is recorded on the film 100 as already described.

In encoding the altitude information on the film 100, as well as in setting the bench mark q of FIG. 3, the depth of profile $\Delta H$ should be taken into account to insure optimum utilization of the available angular range. This angular range $\beta$, as shown in FIG. 8, may be close to 360°, with the variable angle $\theta$ assuming either positive or negative values to indicate positive or negative deviations $+\epsilon$ $-\epsilon$ from the mean altitude $H_o$. The positive and negative halves of this range are separated by a small unused sector of angle $\theta_o$.

FIG. 9 illustrates a typical configuration of a bench mark q (and therefore also of a topographic pattern p) found suitable for purposes of this invention. This pattern comprises a quasi-random combination of holes (either physical apertures or transparent inserts) on an opaque background, the holes being so distributed on several concentric circles $k_1$, $k_2$ (only two shown) that no two adjoining holes have the same spacing. More particularly, the holes on circle $k_1$ are separated by progressively larger multiples of the hole diameter $d_1$ (though the illustrated order need not be maintained), the hole spacings on circle $k_2$ being also different multiples of the diameter $d_2$. It is assumed that these diameters $d_1$ and $d_2$ are proportionately related to each other in the same manner as are the radii $r_1$, $r_2$ of the corresponding circles, each hole on either circle thus subtending the same angle $\theta_o$ which, in the case of nine holes per circle, will have a magnitude of 8°. With this assumption, the angular range $\beta$ in FIG. 8 extends over 352°. The holes shown in FIG. 9 should be large enough—e.g. at least several tenths of a millimeter in diameter—to avoid perceptible diffraction of the light passing therethrough.

FIG. 10 shows the amplitude of a light pulse P generated when two identical figures as shown in FIG. 9, i.e. a topographic marking and a rotatable bench mark, are optically aligned so as to be transluminated by parallel rays. The pulse P is generally triangular with a base $2\theta_o$ and an amplitude S many times greater than that of stray light pulses occurring in different angular positions. If these angular positions are quantized in terms of multiples of $\theta_o$, two pulses due to topographic markings $2\theta_o$ (e.g. 16°) apart will be distinctly separated. As seen in FIG. 10, however, this spacing may be halved (i.e. reduced to $\theta_o$ or 8°) without apparent merger of the peaks of adjoining pulses P and P'. Thus, the angular range $\beta$ indicated in FIG. 8 accommodates up to 23 quantized angular positions in the first instance and up to 45 such positions in the second instance.

Depending on the nature of the terrain, the angular quantum $\theta_o=8°$ or $2\theta_o=16°$ may represent different elevational increments. Thus, the actual depth of profile $\Delta H$ of a given measuring zone should correspond to the angle $\beta$ so that, in every case, $\epsilon:\Delta H=\theta:\beta$. In practice, it will usually be expedient to round off the value of $\Delta H$ as registered on the film 100 to the nearest one of several predetermined magnitudes such as, for instance, 100, 250, 500, 750 and 1000 m, these magnitudes representing different classifications of terrain ranging from nearly flat to rugged. With $\Delta H=100$ m, for example, a relative altitude $\pm\epsilon$ of 1 m will be coded as an angle $\theta$ of $\pm 3.5°$ so that the quantum $\theta_o=8°$ represents an elevational increment of 2.25 m; with $\Delta H=1000$ m, the value of this elevational increment must be multiplied by 10.

Figure 11:
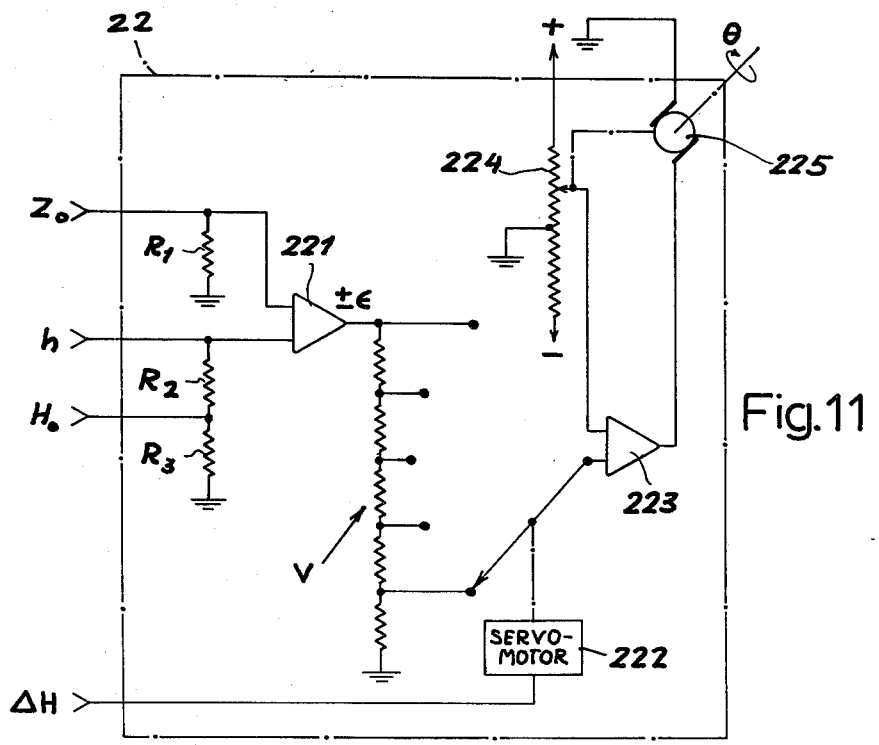
FIG. 11 is a block diagram of a bench-mark-control unit included in the system of FIG. 4.

FIG. 11 shows details of the control unit 22 which receives the prerecorded data $H_o$ and $\Delta H$ from reader 26 and the measured values $Z_o$ and h from altimeters 27 and 28, respectively, to determine the magnitude of the relative altitude $\epsilon=Z_o-H_o-h$ and to establish the desired proportionality ratio between $\epsilon$ and the corresponding angle $\theta$ through whch the bench mark q (FIG. 3) must be rotated to represent that relative altitude. Unit 22 comprises a voltage divider V receiving a voltage proportional to $\pm\epsilon$ from the output of a d-c amplifier 221 which is differentially energized by a voltage proportional to $Z_o$, applied across a resistor $R_1$, and a voltage proportional to $H_o+h$, applied across a pair of resistors $R_2$, $R_3$. A servomotor 222, responding to a voltage proportional to $\Delta H$, sets the selector arm of voltage divider V to apply a fraction of the output voltage of amplifier 221, inversely proportional to the value of $\Delta H$, to an input of a differential amplifier 223 whose other input is energized from a potentiometer 224. The output of amplifier 223 energizes, according to its polarity, a motor 225 for rotation in one direction or the other, this motor being also coupled with the slider of potentiometer 224 to balance the input voltages of amplifier 223 whenever the motor shaft has assumed an angular position corresponding to the value of $\epsilon$ as proportionately reduced by the voltage divider V. In the particular example given above, and with the aircraft approaching rugged terrain falling within the classification $\Delta H = 1000$ m, servomotor 222 may move the arm of voltage divider V into its illustrated bottom position in which only one-tenth of the output voltage of amplifier 221 is effective to energize motor 225; in this case, an input voltage signifying a relative magnitude of $\epsilon = \pm 500$ m would be required to rotate the motor shaft through its maximum angle $\beta/2 = \pm 176°$. On the other hand, if the territory is nearly flat and $\Delta H = 100$ m, the full output voltage of amplifier 221 would be applied to the input of amplifier 223 so that the same angle of rotation would ensue from an input voltage signifying a relative altitude of $\epsilon = \pm 50$ m. Drive motor 225 should be of very low inertia, in order to respond virtually instantaneously to the rapidly recurring altitude soundings at the intervals set by timer 23, and may be mechanically or electrically indexable to stop only in the quantized angular positions hereinabove defined.

Reference will now be made to FIG. 12 for a description of the evaluator 25. This evaluator comprises a vidicon tube 251 which forms the receiving surface RS in the focal plane of lens L and whose scanning beam is controlled by a set of sweep circuits, not shown, connected to its deflecting coils 257 and to similar deflecting elements 255 of a storage tube 252. The output of tube 251, consisting of discrete pulses w, is fed to a contraster 253 which magnifies their amplitude differences and which places these pulses on a pedestal so that only the larger puslses W will pass the response threshold of storage tube 252 to which they are fed. Beside a high-speed recording beam 258, controlled by the deflectors 255, tube 252 also has a low-speed reading beam 259 responding to deflectors 256 whose sweep circuit, not shown, is energized under the control of calculator 21 (FIG. 4) after sampling has been completed. During the reading cycle, the parameters $\Delta x$, $\Delta y$ are supplied by the tube 252 to the computer 11 of FIG. 4.

In FIG. 15 we have illustrated an alternative evaluator wherein the converging rays from lens L are intercepted by a semisilvered mirror 151 which partly deflects them toward an array of photocells 152 whose cathodes, collectively, constitute the receiving surface. The undeflected ray energy impinges upon a photoluminescent screen 153 which, by virtue of its luminous retentivity, displays the bright spot B of FIG. 2 for visual determination of the deviation $\Delta x$, $\Delta y$. These parameters are also available from an array of storage condensers 154, respectively connected across the photodiodes 152, for delivery to the computer 11. The remanence of the screen 153 may be of the same order as that of the human eye.

FIG. 13 exemplifies a modified correlator 20' wherein the source 30, 32 of diffused light (FIG. 3) has been replaced by a source of coherent light, specifically a laser 130 periodically stimulated under the control of timer 23 during sampling. A deflector 132 directs the laser beam onto the film 100 whose transparent markings p' are here shown to consist of identically shaped but differently oriented sets of three pinholes each, the three pinholes defining the corner of a scalene triangle and being of such size (e.g. on the order of 0.1 mm or less) as to diffract the incident monochromatic radiation. The resultant diffraction pattern, irregular and asymmetric in shape, corresponds to a pattern of transparent lines q' which define a light gate and are disposed on a rotatable carrier 131 in a focal plane of a lens $L_1$ whose other focal plane substantially coincides with the plane of film 100. Lens $L_1$ thus creates a virtual image of the diffraction pattern from which divergent light rays reach the light gate q' in a manner analogous to that described in connection with correlator 20 (FIG. 3). Thus, a beam of parallel rays will be produced by light passing through the gate q' from the virtual image of any such diffraction pattern having the same angular orientation as the pattern q'. This bundle of parallel rays is then focused upon the receiving surface RS by a second lens $L_2$ to generate a contour line c in the manner heretofore described.

FIG. 14 shows a representative physical arrangement of the mechanism used to displace the film 100 and the light gate q in the way discussed above. The film 100 is unwound from a storage reel 102 and wound upon a take-up reel 103 by means of a gear coupling 104 driven by the shaft 242x of servomotor 240x. The film and its supports are carried on a bar 105 whose vertical position is variable, with the aid of a cam 106, under the control of the shaft 242y of servomotor 240y. An opaque mask 107 obscures the major part of the film, leaving free a square or rectangular area which corresponds to the aforedescribed region of uncertainty U. The light source 30 is disposed behind the film, as is the reader 26, yet in the correlator of FIG. 14 the light gate q is positioned forwardly of the film in contradistinction to the arrangement shown in FIG. 3. In fact, this light gate is carried here directly on a face of the lens L which serves as a rotatable support therefor, being driven by motor 225 through a pinion 108 engaging a toothed lens-holding ring 109. This direct mounting of the light gate on the lens not only simplifies the overall structure of the correlator but also permits a substantial reduction of the lens diameter. The other element of the system, not shown in FIG. 14, are the same as heretofore described in connection with FIGS. 4, 6, 11 and 12.

Naturally, the principles described hereinabove may be embodies in systems deviating in various respects from those specifically shown and described without departing from the spirit and scope of our invention as defined in the appended claims.

We claim:

1. A navigational system for the guidance of an aircraft on a high-speed overland flight, comprising aboard the aircraft, in combination with autopilot means for substantially holding the aircraft on a predetermined course and measuring means for taking instantaneous readings of a reference parameter of the overflown terrain;

recording means bearing a plurality of two-dimensional arrays of optically explorable prerecorded markings representing the values of said reference parameter in different elemental areas of respective measuring zones, each array encompassing a series of regions of uncertainty centered on respective measuring points along a simulated trajectory representing said predetermined course within a respective measuring zone, the extent of said regions of uncertainty being determined by the maximum possible deviation of the flight path of the aircraft under the control of said autopilot means from said predetermined course during travel from a preceding point of coincidence between said predetermined course and said flight path;

evaluation means forming a receiving surface;

comparison means including an orientable bench mark displaceable in response to said measuring means for indicating the reference parameter of the terrain actually overflown at successive instants during passage through a measuring zone, said comparison means further including optical correlator means for concurrently directing light rays upon said bench mark and upon the prerecorded markings of a given zone of uncertainty to correlate said bench mark with any of said markings representing the same reference parameter and to focus the light rays from the last-mentioned markings onto said receiving surface, thereby producing on said surface a contour line defined by all locations within the region of uncertainty having the same reference parameter;

programming means for relatively displacing said correlator means and any of said arrays during a respective measuring interval at an average rate proportional to the presumed speed of the aircraft and in a direction keeping said correlator means trained upon said simulated trajectory of the array and for repetitively operating both said measuring means and said comparison means throughout said measuring interval to sample the markings of an array and to project upon said receiving surface a plurality of intersecting contour lines during passage of the aircraft through any given measuring zone; and storage means in said evaluation means for retaining information from the projected contour lines throughout said measuring interval and developing a cumulative output at a location corresponding to the point of intersection of the contour lines on said receiving surface, thereby indicating the true location of said flight path with reference to said predetermined course.

2. A system as defined in claim 1 wherein said prerecorded markings are identically shaped but distinctively oriented transparencies and wherein said bench mark comprises a rotatable light gate optically related to said transparencies, said correlator means including a source of light rays arranged to traverse said light gate and to pass simultaneously through all the transparencies of a given region of uncertainty.

3. A system as defined in claim 2 wherein said transparencies are constituted by an asymmetrical combination of holes.

4. A system as defined in claim 3 wherein said source is a producer of coherent light and said holes are small enough to diffract said coherent light in an irregular pattern, said light gate being a transparency conforming to said pattern.

5. A system as defined in claim 4 wherein said correlator means includes first objective means for training pattern-focusing light rays from said holes upon said light gate, and second objective means for focusing parallel rays from said light gate upon said receiving surface.

6. A system as defined in claim 2 wherein said light gate is a transparency substantially identical with said markings, said correlator means including objective means for focusing beams of substantially parallel light rays from said light gate upon said receiving surface.

7. A system as defined in claim 6 wherein each of said transparencies consists of a pattern of holes distributed with nonuniform spacings along at least one circle, the distance between adjacent holes being a whole multiple of a hole diameter.

8. A system as defined in claim 2 wherein said correlator means includes a lens for projecting said light rays onto said receiving surface, said lens being rotatably mounted and having a face carrying said light gate.

9. A system as defined in claim 2 wherein said measuring means comprises altimetric equipment coupled with said light gate for rotating same.

10. A system as defined in claim 9 wherein said recording means is provided with terrain information indicating level differences characteristic for a particular measuring zone, said altimetric equipment being provided with adjustable drive means responsive to said terrain information for modifying the angle of rotation of said light gate, upon a predetermined change in altitude of the overflown terrain, in accordance with the value of said characteristic differences, thereby spreading the range of existing level differences substantially over the entire available angular range of said light gate during overflight of each measuring zone.

11. A system as defined in claim 10 wherein said recording means comprises a film strip having spaced-apart portions bearing said two-dimensional arrays, said terrain information being recorded on said film strip in the spaces immediately preceding the arrays relating to the respective measuring zones.

12. A system as defined in claim 11 wherein said film strip is also provided with data in said spaces representing the co-ordinates of the region of the next-succeeding measuring zone with reference to a predetermined starting point, said programming means being provided with reading means for ascertaining said date and determining therefrom the law of displacement of said film strip relative to said correlator means during sampling of the next succeeding array.

13. A system as defined in claim 12 wherein said evaluation means is provided with an output circuit connected to said programming means for modifying the operation thereof between sampling of successive arrays by said correlator means, said programming means being arranged to make said output circuit effective upon completion of sampling of a preceding array.

14. A system as defined in claim 11 wherein said correlator means further comprises masking means adjacent said film strip for optically obstructing all but a given region of uncertainty of each array during sampling, the rate of displacement of said film strip with reference to said masking means between successive measuring intervals being less than the width of a region of uncertainty whereby certain of said markings are repetitively sampled by said correlator means.

15. A system as defined in claim 1 wherein said storage means comprises an array of photoelectric transducers and a charge accumulator individually connected to each of said transducers.

16. A system as defined in claim 1 wherein said storage means comprises an electronically chargeable screen, said correlator means further including electronic scanning means for converting an image of said contour lines of said receiving surface into a charge pattern on said screen.

17. A system as defined in claim 1 wherein said storage means comprises a retentive photoluminescent layer on said receiving surface.

* * * * *